(12) United States Patent
Franceschini et al.

(10) Patent No.: US 9,864,043 B2
(45) Date of Patent: Jan. 9, 2018

(54) FMCW RADAR WITH PHASE ENCODED DATA CHANNEL

(71) Applicant: Honeywell International Inc., Morristown, NJ (US)

(72) Inventors: Michael R. Franceschini, Centerport, NY (US); John B. Mckitterick, Columbia, MD (US)

(73) Assignee: Honeywell International Inc., Morris Plains, NJ (US)

( * ) Notice: Subject to any disclaimer, the term of this patent is extended or adjusted under 35 U.S.C. 154(b) by 332 days.

(21) Appl. No.: 14/637,102

(22) Filed: Mar. 3, 2015

(65) Prior Publication Data

US 2016/0047892 A1 Feb. 18, 2016

Related U.S. Application Data

(60) Provisional application No. 62/027,818, filed on Jul. 23, 2014, provisional application No. 62/028,768, filed on Jul. 24, 2014.

(51) Int. Cl.
| | |
|---|---|
| *G01S 13/06* | (2006.01) |
| *G01S 7/00* | (2006.01) |
| *G01S 13/32* | (2006.01) |
| *G01S 13/34* | (2006.01) |
| *G01S 13/87* | (2006.01) |
| *G01S 7/35* | (2006.01) |
| *G01S 13/93* | (2006.01) |

(52) U.S. Cl.
CPC .............. *G01S 7/006* (2013.01); *G01S 13/32* (2013.01); *G01S 13/34* (2013.01); *G01S 7/352* (2013.01); *G01S 13/87* (2013.01); *G01S 13/93* (2013.01)

(58) Field of Classification Search
CPC .......... G01S 13/32; G01S 13/34; G01S 13/87; G01S 13/93; G01S 7/006; G01S 7/352
USPC ....................................... 342/59, 60
See application file for complete search history.

(56) References Cited

U.S. PATENT DOCUMENTS

| | | | |
|---|---|---|---|
| 3,818,378 | A | 6/1974 | Phillips |
| 4,176,351 | A | 11/1979 | DeVita et al. |
| 4,733,238 | A | 3/1988 | Fiden |
| 5,220,331 | A | 6/1993 | Neininger |
| 5,270,720 | A | 12/1993 | Stove |
| 5,712,639 | A | 1/1998 | Hethuin |
| 5,892,477 | A | 4/1999 | Wehling |
| 5,999,119 | A | 12/1999 | Carnes et al. |

(Continued)

FOREIGN PATENT DOCUMENTS

| | | |
|---|---|---|
| CN | 201503494 U | 6/2010 |
| WO | 2008079004 A1 | 7/2008 |

OTHER PUBLICATIONS

International Search Report and Written Opinion of International Application No. PCT/US2015/040248, dated Apr. 27, 016, 16 pp.

(Continued)

*Primary Examiner* — Timothy A Brainard
(74) *Attorney, Agent, or Firm* — Shumaker & Sieffert, P.A.

(57) ABSTRACT

Methods and devices are disclosed of using a Frequency-Modulated-Continuous-Wave (FMCW) radar unit for data communication by receiving a signal with a phase encoded data channel, and processing the signal with the phase encoded data channel to simultaneously determine data and timing information.

20 Claims, 4 Drawing Sheets

(56) References Cited

U.S. PATENT DOCUMENTS

| | | | |
|---|---|---|---|
| 6,107,959 A * | 8/2000 | Levanon | G01S 5/0036 |
| | | | 342/357.64 |
| 6,313,782 B1 | 11/2001 | Lehan et al. | |
| 6,353,409 B1 * | 3/2002 | Keller | G01S 19/15 |
| | | | 342/357.31 |
| 6,633,253 B2 | 10/2003 | Cataldo | |
| 6,856,276 B2 | 2/2005 | Barrick et al. | |
| 7,315,239 B2 | 1/2008 | Cheng et al. | |
| 7,486,221 B2 | 2/2009 | Meyers et al. | |
| 7,495,604 B2 | 2/2009 | Yamano et al. | |
| 7,515,091 B2 | 4/2009 | Meyers et al. | |
| 7,760,133 B2 | 7/2010 | Shirai et al. | |
| 7,940,743 B2 | 5/2011 | Seisenberger et al. | |
| 7,978,123 B2 | 7/2011 | Lam et al. | |
| 8,031,690 B2 | 10/2011 | Aiello et al. | |
| 8,044,839 B2 | 10/2011 | Sutphin | |
| 8,559,554 B2 | 10/2013 | Vossiek et al. | |
| 8,730,088 B2 | 5/2014 | Milligan et al. | |
| 2005/0013389 A1 * | 1/2005 | Mizukami | H04L 27/2271 |
| | | | 375/323 |
| 2005/0030935 A1 | 2/2005 | Seisenberger et al. | |
| 2005/0225481 A1 * | 10/2005 | Bonthron | G01S 7/032 |
| | | | 342/175 |
| 2006/0181448 A1 | 8/2006 | Natsume et al. | |
| 2007/0096885 A1 * | 5/2007 | Cheng | B60W 40/04 |
| | | | 340/435 |
| 2007/0152871 A1 | 7/2007 | Puglia | |
| 2009/0243913 A1 | 10/2009 | Sekiguchi et al. | |
| 2009/0285313 A1 | 11/2009 | Vossiek et al. | |
| 2009/0309782 A1 | 12/2009 | Takabayashi et al. | |
| 2009/0309785 A1 | 12/2009 | Nalezinski et al. | |
| 2010/0073222 A1 | 3/2010 | Mitomo et al. | |
| 2012/0119938 A1 | 5/2012 | Abe et al. | |
| 2012/0188125 A1 | 7/2012 | Pomietlasz | |
| 2012/0268317 A1 | 10/2012 | Himmelstoss et al. | |
| 2012/0283987 A1 | 11/2012 | Busking et al. | |

OTHER PUBLICATIONS

International Preliminary Report on Patentability from International Application No. PCT/US2015/040248, dated Feb. 2, 2017, 9 pp.

Blunt, "Radar-Embedded Communications," ITTC Radar Systems & Remote Sensing Lab (RSL), Information and Telecommunication Technology Center, University of Kansas, Apr. 2009, 14 pp.

Fan, "GALS Design Methodology Based on Pausible Clocking," Dissertation, University of Berlin, Jun. 31, 2013, 137 pp.

Minihold et al., "Introduction to Radar System and Component Tests: White Paper," Rohde & Schwarz, Aug. 2012, 29 pp.

Sit et al., "The OFDM Joint Radar-Communication System: An Overview," SPACOMM 2011, The Third International Conference on Advances in Satellite and Space Communications, IARIA, Apr. 2011, 6 pp.

Wang et al., "Performance Prediction of a Synchronized Link for Distributed Aerospace Wireless Systems," The Scientific World Journal, Jul. 2013, 10 pp.

Stelzer et al., "Precise Distance Measurement with Cooperative FMCW Radar Units," Radio and Wireless Symposium, IEEE, Jan. 2008, 4 pp.

* cited by examiner

FMCW RADAR WITH PHASE ENCODED DATA CHANNEL

This application claims the benefit of each of the following U.S. Provisional applications, the entire contents of each of which is incorporated herein by reference:

U.S. Provisional Application Ser. No. 62/027,818, filed 23 Jul. 2014;

U.S. Provisional Application Ser. No. 62/028,768, filed 24 Jul. 2014.

TECHNICAL FIELD

This disclosure relates to radar systems and, more particularly, to Frequency-Modulated-Continuous-Wave (FMCW) radar systems.

BACKGROUND

Frequency-Modulated-Continuous-Wave (FMCW) radar is a type of radar system where a known stable frequency continuous wave varies up and down in frequency over a fixed period of time by a modulating signal. A frequency difference between the receive signal and the transmit signal increases with delay, and hence with distance. The radar system then mixes echoes from a target with the transmitted signal to produce a beat signal which will give the distance of the target after demodulation.

SUMMARY

In general, various examples of this disclosure are directed to a Frequency-Modulated-Continuous-Wave (FMCW) radar. Various examples of this disclosure may allow for processing of a signal to simultaneously determine data and timing information. Various examples of this disclosure may also allow for processing of a signal to simultaneously determine obstacle detection information in addition to data and timing information.

In one example, the disclosure is directed to a method of receiving a signal with a phase encoded data channel, and processing the signal with the phase encoded data channel to simultaneously determine data and timing information.

In another example, the disclosure is directed to a FMCW radar device, the FMCW radar device includes one or more antennas configured to receive a signal with a phase encoded data channel, a mixer configured to receive the signal from the one or more antennas and generate a difference signal, an analog-to-digital converter (ADC) configured to convert the difference signal of the mixer to a digital difference signal, a clock configured to drive a signal processing unit, one or more processors of the signal processing unit configured to process the digital difference signal to simultaneously determine data and timing information, and a memory, wherein the memory is configured to store the data and the timing information.

In yet another example, the disclosure is directed to a FMCW radar device, the FMCW radar device includes one or more antennas configured to receive a signal with a phase encoded data channel, a mixer configured to receive the signal from the one or more antennas and generate a difference signal, an analog-to-digital converter (ADC) configured to convert the difference signal of the mixer to a digital difference signal, a clock configured to drive a signal processing unit, one or more processors of the signal processing unit configured to process the signal with the phase encoded data channel to simultaneously determine data, timing information, and obstacle detection information, and a memory, wherein the memory is configured to store the data, the timing information, and the obstacle information.

The details of one or more examples are set forth in the accompanying drawings and the description below. Other features, objects, and advantages will be apparent from the description and drawings, and from the claims.

DETAILED DESCRIPTION

Various examples are described below generally directed to devices, integrated circuits, systems, and methods for a radar system that combines Frequency-Modulated Continuous-Wave (FMCW) radar and a phase encoded data channel. This disclosure describes techniques for adding data communication to platforms with existing FMCW radar. In general, FMCW radar may be used to measure the range (e.g., distance) to objects in the field of view (such as terrain or other obstacles).

By not requiring additional hardware, the techniques of this disclosure may be implemented without adding weight or significantly increasing power consumption. In this way, small vehicles such as unmanned aerial systems (UAS), which may not have the capacity to carry multiple sensors to support navigation, surveillance, and communication may be able use the techniques of this disclosure without a decrease in system efficiency while enabling communication capabilities.

Figure 1:
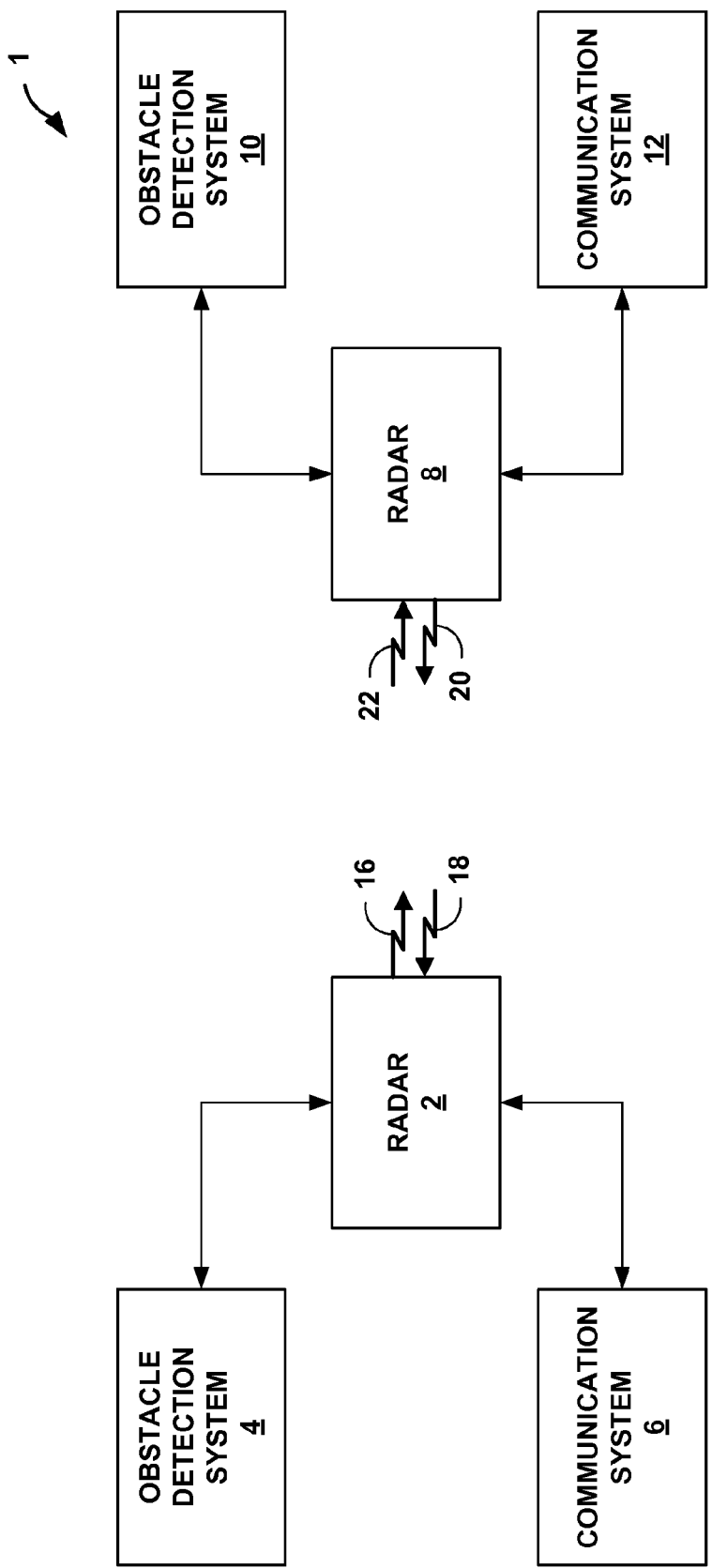
FIG. 1 illustrates a block diagram of an example Frequency-Modulated Continuous-Wave (FMCW) radar system, in accordance with various aspects of this disclosure.

FIG. 1 illustrates a block diagram of example Frequency-Modulated Continuous-Wave (FMCW) radar system 1, in accordance with various aspects of this disclosure. In the example of FIG. 1, FMCW radar system 1 includes radars 2 and 8, obstacle detection systems 4 and 10, and communication systems 6 and 12. Although, radars 2 and 8 are each referred to as a "radar," "radar device," or "radar unit," it should be understood that radars 2 and 8 may each be a radar system, and collectively radars 2 and 8 may form FMCW radar system 1.

Radars 2 and 8 may each be FMCW radars. Radar 2 transmits signal 16 and receives signal 18. Radar 8 transmits signal 20 and receives signal 22.

Obstacle detection system 4 and 10 may be configured to detect obstacles based on signals 18 and 22 received as reflections off of an obstacle. For example, radar 2 may transmit signal 16 and receives, as signal 18, a reflected version of signal 16. Signal 16 may, for example, be reflected off of a target. In some examples, signal 16 may be processed to determine obstacle detection information. Radar 8, similarly, may transmit signal 20 and receive a reflected version of signal 20. The reflected version of signal 20 may be shown in FIG. 1 as signal 22. In some examples, signal 22 may be processed to determine obstacle detection information. In these examples, the obstacle detection information may be used by obstacle detection system 4 to obtain positioning information and/or perform a navigation function.

Communication systems 6 and 12 may be configured to transmit data by including a phase encoded data channel in signals 16 and 20 and receive data and timing information by processing the phase encoded data channel in signals 18 and 22 received at radars 2 and 8 to simultaneously determine the data and timing information. For example, radar 2 may transmit signal 16 and receives, as signal 18. Signal 18 may, for example, be signal 20 transmitted by radar 8. Radar 8, similarly, may transmit signal 20 and receive signal 22. Signal 22 may, for example, be signal 16 transmitted by radar shown in FIG. 1. In some examples, radars 2 and 8 may be configured to communicate with each other or with other FMCW compatible systems using phase encoded data channels in signals 16-22. In some examples of this disclosure, simultaneously determining the data and timing information may refer to determining both the data and timing information at approximately the same time, for example processing both the data and timing information in parallel. In some examples, simultaneously determining the data and timing information may alternatively or additionally refer to determining both the data and timing information from the same signal or signals.

Radars 2 and 8 may transmit signals 16 and 20 with a frequency that is a linear ramp that is repeated over a short period of time (e.g., 1 millisecond (ms)). Equation 1 may express the frequency of the transmitted signals 16 or 20.

$$f(t) = \begin{cases} f_b + f_1 t, & \text{for } t < T - t_b \\ f_b + f_1 \frac{T-t}{T}, & \text{for } T - t_b < t < T \end{cases} \quad (1)$$

In equation 1, $f_b$ is the baseband frequency, $f_1$ is the rate in megahertz per second (MHz/s) of the frequency ramp, T is the period of the repeated frequency ramp, and $t_b$ is the time for the added frequency to return to zero from the peak frequency. For instance, T may be 4 ms, and the frequency ramp may have a peak frequency that may be 800 MHz above the baseband frequency. In some examples, T may be 1 to 50 ms, and the frequency ramp may have a peak frequency that may be 50 to 800 MHz above the baseband frequency.

Radars 2 and 8 may each include a mixer that mixes the received signal with the transmitted signal. As received signal 18 may have to travel to a target and back, received signal 18 may have a time delay of 2d divided by c, where d is the distance to the target and c is the speed of light. In some examples, the time delay may also affect the frequency of received signal 18. The output of the mixer may be a beat signal (e.g., a difference signal), where the beat signal is the instantaneous frequency difference of the transmitted signal and the received signal. The mixer of radar 2, for example, may mix signal 16 and signal 18 to determine a beat signal corresponding to the instantaneous difference of signal 16 and 18. In some examples, the output of the mixer (e.g., the difference signal) may be a single frequency corresponding to the difference in two frequency ramps, where each frequency ramp may be similar to the frequency ramp as described in FIG. 3. In these examples, sampling the difference signal using an analog-to-digital converter (ADC) at an appropriate rate may allow measurement of the frequency using a simple Fast Fourier Transform (FFT). In this way, the peaks in the output of the FFT correspond to reflections from the target. The mixer of radar 8 may likewise mix signal 20 and 22 to determine a beat signal corresponding to the instantaneous time difference of signals 20 and 22, and an ADC of radar 8 may sample the beat signal, which may allow for measurement of the frequency using a simple FFT.

In the example of FIG. 1, radars 2 and 8 may each be a multifunction sensor, which may include a FMCW radar core with waveform modulation overlays, and augmented software/firmware processing algorithms to support data and precision time transfer between platforms. In some examples, these signal format enhancements (e.g., a phase encoded data channel) may complement the radar detection modes of radars 2 and 8, adding parallel processing that preserves the positioning and navigation functions, while simultaneously enabling high accuracy time-of-arrival estimation for precision relative timing between radars 2 and 8. For example, phase-shift keyed (PSK) data symbols may be used for time stamp and distributed network synchronization messages by phase modulating shorter time/frequency subdivisions of a full FMCW ramp of radars 2 and 8. In some examples, these shorter subsegments (e.g., PSK data symbols) may also be used as partial band preambles for rapid radar acquisition, direct sequence spectrum spreading (DSSS), and/or frequency hop spectrum spreading (FHSS) for Low Probability of Intercept/Anti-Jam (LPI/AJ) benefits.

In the example of FIG. 1, precision time synchronization and data transfer between radars 2 and 8 (e.g., two nodes) may utilize more complex signal processing than the FMCW radar mode because of the large initial (time and/or frequency) search uncertainty of received signals 18 and 22. For example, in FMCW radar mode, received signal 18 may be a delayed replica of transmitted signal 20, and received signal 22 may be a delayed replica of transmitted signal 16, with the delays bounded by a maximum range. In this example, after FMCW de-chirping, the search uncertainty that corresponds to a maximum frequency uncertainty AF to search over will be less than the full ramp span because there is some decompression associated with de-chirping. In this manner, since radars 2 and 8 may transmit saw-tooth sweeps continuously, radars 2 and 8 may search the uncertainty region over multiple FMCW ramps until radars 2 and 8 lock onto a return from each other. In this way, a reply acknowledgement may be transmitted from either radar 2 or 8 after radar 2 or 8 has successfully received the initial transmission from the other radar. In some examples, radars 2 and 8 may have no prior ramp timing knowledge assumed between radars 2 and 8 for a data message and timing-of-arrival (ToA) mode, such that radars 2 and 8 may not be able narrow the uncertainty search to less than the entire FMCW ramp span and potential baseband AF. In some examples, radars 2 and 8 may have to accomplish the uncertainty search quickly at the front of a packet message burst (e.g., desirably within 1 FMCW ramp, 4 milliseconds) to ensure efficient data recovery. In some examples, two techniques may be traded-off for size, weight, and power (SWaP) and performance to perform synchronization on a FMCW ramp with data overlay. In one technique, radars 2 and 8 may use a chirp finite impulse response (FIR) matched filter for real-time shortened symbol correlation. In another technique, radars 2 and 8 may use a sequential search correlation across stored samples of a full FMCW ramp.

In some examples, radars 2 and 8 may use partial-ramp sub-segment symbols for radar acquisition and data communications, and enhanced resolution time-of-arrival estimation on the full FMCW ramp. In these examples, radars 2 and 8 may exploit the significantly higher radar Signalto-Noise ratio (SNR) for the FMCW radar communication mode (e.g., phase encoded data channel) relative to the radar functions (e.g., obstacle detection). For example, the path loss of transmit signal 16 from radar 2 and received as signal 22 at radar 8 may have a one-way transmit-to-receive path (e.g., received power is $1/R^2$). In another example, the path loss of transmit signal 20 from radar 8 and received as signal 18 at radar 2 may have a one-way transmit-to-receive path (e.g., received power is $1/R^2$). Conversely, the path loss of transmit signal 16 from radar 2, reflected off an object, and received as signal 18 at radar 2 may have a two-way transmit-to-receive path (e.g., received power is $1/R^4$). In another example, the path loss of transmit signal 20 from radar 8, reflected off an object, and received as signal 22 at radar 8 may have a two-way transmit-to-receive path (e.g., received power is $1/R^4$). In some examples, radars 2 and 8 may trade-off antenna gain and directivity for quicker beam acquisitions. For example, at a baseband frequency of 35 gigahertz (GHz), a 1 kilometer (km) link range (R) would experience a one-way path loss (e.g., $1/R^2$) of approximately 124 decibels (dB) in free space, not including atmospheric effects. In this example, the two-way path loss (e.g., $1/R^4$) would be approximately 248 dB. In this way, a 40 dB antenna gain may be available at each transmitter and receiver of radars 2 and 8. In some examples, radars 2 and 8 may even use omni-directional beams on both ends of the link for initial signal acquisition (e.g., no directional searching), which may still leave a 44 dB higher SNR for the one-way path loss. In other words, the one-way path loss may have enough SNR to achieve the rapid acquisition of the received FMCW signal on shorter time-bandwidth (TB) devices. In some examples, radars 2 and 8 may use an omni-pattern on a receiver, while radars 2 and 8 may maintain a directional transmitter. In these examples, radars 2 and 8 may have 88 dB excess SNR for the timing and data functions, which may improve the probability of beam coincidence. In these examples, the higher probability of beam coincidence on the omni antenna plus a single-ended directional stepped search may be the preferred approach to a double-ended directional stepping search pattern, as long as there is adequate SNR afforded based on the link range and path loss. In some examples, radars 2 and 8 may use the combination of omni-directional transmission and reception, along with the chirp FIR symbol acquisition technique to enable a quick and efficient neighbor discovery mode that operates well beyond the passive radar detection range. In these examples, radars 2 and 8 may use the quick and efficient neighbor discovery mode, so that friendly node ID and network synchronization may be performed quickly, and unfriendly radar returns may be reconciled as non-cooperative platforms.

Figure 2:
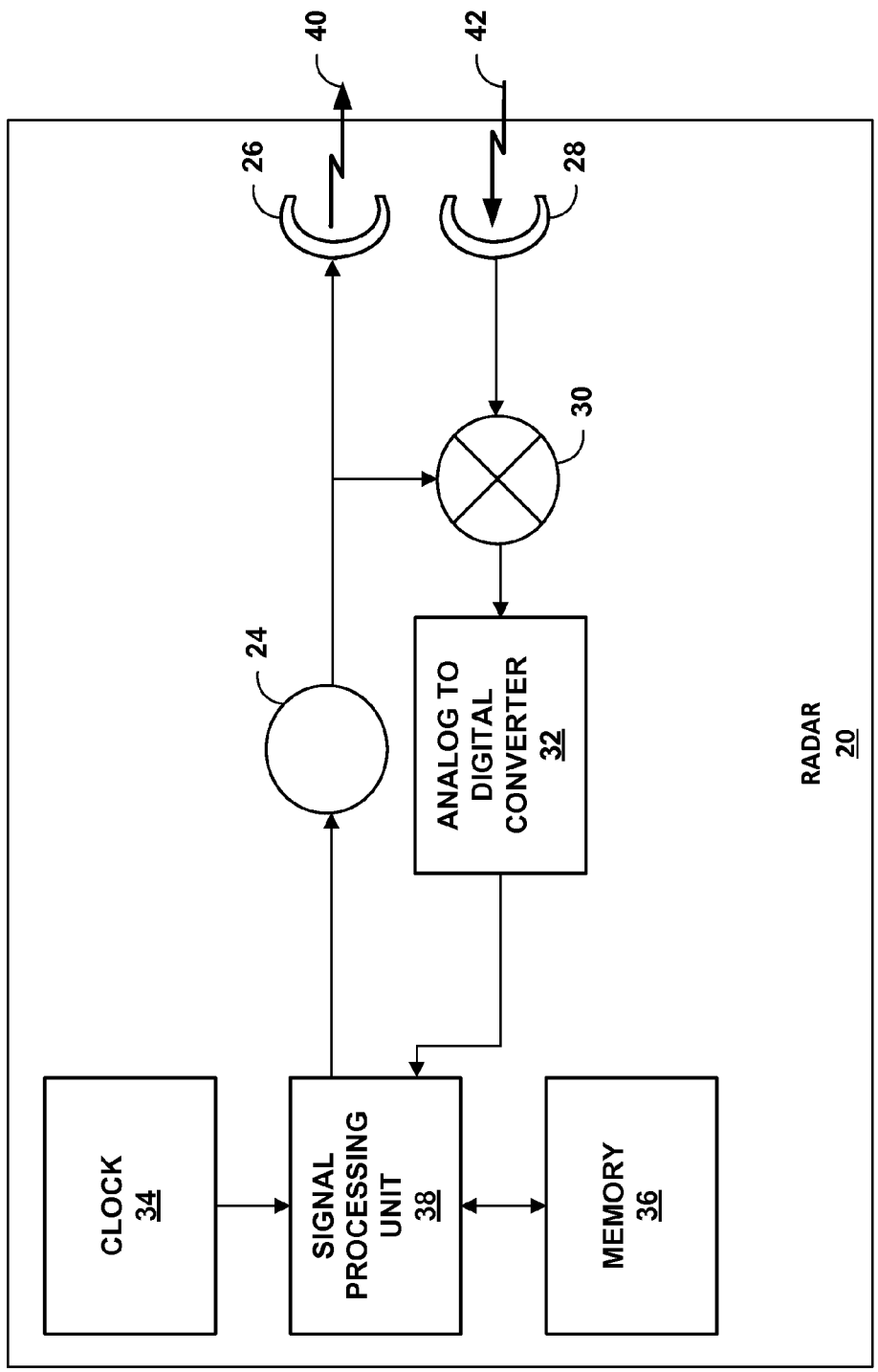
FIG. 2 illustrates a block diagram of an example FMCW radar, in accordance with various aspects of this disclosure.

FIG. 2 illustrates a block diagram of example FMCW radar 20, in accordance with various aspects of this disclosure. Radar 20 of FIG. 2 represents one example configuration for radar 2 and/or radar 8 as described in FIG. 1.

In the example of FIG. 2, radar 20 includes signal processing unit 38, transmitter 24, transmit antenna 26, receive antenna 28, mixer 30, ADC 32, clock 34, and memory 36. In the example of FIG. 2, radar 20 may be configured to transmit signal 42 and receive signal 42.

Signal processing unit 38 is a circuit configured to control transmitter 24. Signal processing unit 38 may comprise any suitable arrangement of hardware, software, firmware, or any combination thereof, to perform the techniques attributed to the respective signal processing unit 38 herein. For example, signal processing unit 38 may include any one or more microprocessors, digital signal processors (DSPs), application specific integrated circuits (ASICs), field programmable gate arrays (FPGAs), programmable logic device (PLD), or any other equivalent integrated or discrete logic circuitry, as well as any combinations of such components. In some examples, signal processing unit 38 may include a direct digital synthesizer (DDS). In these examples, a DDS may be a frequency synthesizer for creating waveforms from a single-frequency reference clock. In some examples, signal processing unit 38 may be a receiver of radar 20.

Transmitter 24 is a circuit configured to generate an RF signal with a linear frequency ramp. Transmitter 24 may include, but not limited to, a voltage controlled oscillator, or any other component capable of generating an RF signal with a linear frequency ramp.

Transmit antenna 26 may be any form of antenna capable of transmitting an RF signal to another source, for example, but not limited to, a directional antenna or an omni-directional antenna. Receive antenna 28 may be any form of antenna capable of receiving an RF signal from another source, for example but not limited to, a directional antenna or an omni-directional antenna. In some examples, transmit antenna 26 and receive antenna 28 may be the same antenna.

Mixer 30 combines transmit signal 40 with received signal 42 to create a beat signal output, and sends the beat signal output to ADC 32. ADC 32 performs a digital conversion of the beat signal output from mixer 30, and sends the digitized beat signal to signal processing unit 38. Signal processing unit 38 transforms the digital beat signal to the frequency domain. Signal processing unit 38 then generates an output that is sent to an output device for presentation.

Clock 34 is a circuit configured to generate and provide a baseband frequency to signal processing unit 38. For example, clock 34 may be used with the DDS of signal processing unit 38. Memory 36 is a circuit configured to store data and/or instructions, and may include random access memory (RAM) integrated circuits, cache circuits, and/or one or more volatile or more or less short-term data storage devices. Memory 36 may also include one or more devices or systems (e.g., hard drives, solid state drives) that may function or be used as either long-term data storage and/or short-term memory. For example, memory 36 may be configured to store data from to or reception from other radars.

In some examples, radar 20 may use signal processing unit 38 to control transmitter 24 to transmit signal 40 with a frequency that is a linear ramp that is repeated over a short period of time (e.g., 1 ms). For example, Equation 1 as described in FIG. 1 may express the frequency of the transmitted signal 40.

The transmitted signal 40 from radar 20 may be reflected from a target, and radar 20 may receive the reflected signal as received signal 42. Radar 20 may mix the received signal 42 from the target with the transmitted signal 40 with mixer 30. The output of mixer 30 may be a beat signal (e.g., a difference signal), where the beat signal is the instantaneous difference (e.g., frequency and/or time) of transmitted signal 40 and received signal 42. The output of mixer 30 may be a single frequency corresponding to the difference between the frequency ramps of transmitted signal 40 and received signal 42. Sampling the mixed signal using ADC 32 at an appropriate rate may allow measurement of the frequency using a simple FFT. In this way, the peaks in the output of the FFT correspond to reflections from the targets.

In the example of FIG. 2, radar 20 may use signal processing unit 38 to generate data and phase encode a data channel with the data in signal 40 and control transmitter 24 to transmit signal 40 to another radar. Radar 20 may be at a distance from the other radar, such that received signal 42 from the other radar may have a time delay (e.g., "time-of-flight delay") when compared to transmitted signal 40 was transmitted.

In some examples, the finite-infinite response (FIR) matched filter approach may provide the benefit of real-time acquisition and data recovery, without the delay incurred in a symbol storage and multi-pass sequential processing architecture. In other words, symbol integration detection, and data recovery may be immediate upon received symbol correlation in the filter. In some examples, the technique of incorporating a phase encoded data channel into transmitted signal 40 may be implemented by a FPGA. In some examples, the technique of incorporating a phase encoded data channel into transmitted signal 40 may be improved when the data symbol length and integration space remains practically short. For example, for a sub-segment data symbol of the 250 micro-seconds (μs) spanning 50 MHz, the sample rate of ADC 32 may be as low as 100 Mega Samples per second (MSps), and the FIR may have only 25000 taps, which may be within reasonable implementation boundaries for low SWaP. Conversely, for example, the full FMCW ramp span may yield a time-bandwidth (TB) as great as 3.2*10⁶, based on a 800 MHz FMCW ramp and a 4 ms sweep time, but may be an unrealistic FIR filter length (e.g., 6.4 million traps) and ADC sample rate (e.g., 1600 MSps).

In some examples, the phase encoded data channel may demand a different local oscillator (LO) scheme than the normal FMCW radar mode, which may require increased processing of the full FMCW sweep for the full time-bandwidth (TB) product gain the phase encoded data channel may need to be reassembled from 16 correlation outputs from the FIR. In some examples, reassembly of the phase encoded data channel may be done in a recursive integrator, either non-coherently with minimal loss (e.g., less than 1 dB at these output SNRs), or with data decision aided phase flipping of data symbols if coherent integration is desirable. In this manner, design values for the filters, sweep, symbol lengths, and symbol integration approach may be determined based on the specific application design.

In some examples, data transfers may have phase encoding by the DDS generating the sweep directly, and data recovery may be phase detection of the correlated chirp FIR output on each symbol. In some examples, the ramp portion may be implemented by start frequency and incremented in the DDS of signal processing unit 38, or by lookup table. In these examples, data bit overlays may be synchronized with the ramp times. For example, the first data symbol of the first sweep in the packet message burst may be the phase reference, and each subsequent data symbol may be a data bit. In some examples, for a 250 micro-second (μs) data symbol, there may be one phase reference bit and up to fifteen data bits in the first sweep, and 16 data bits in each sweep after the first sweep. In these examples, each sweep may be 4 ms. In some examples, shorter data symbols may be used to support larger data payloads as needed (e.g., there may be plenty of excess SNR for shorter TB product data symbols, and the FIR filter length may decease with symbol length). In this way, the radar function may be preserved in the originating transmitter node, since signal processing unit 38 may know the data overlay sent, and may strip the data overlay off the return signal before integrating the return sweep in the FFT. In some examples, the return signal timing may be approximately known, and may improve the stripping of the data overlay from the return signal. In some examples, a one-way data link to time stamp the transmission time and data reception time along with the FMCW radar function (e.g., obstacle detection system) may operate simultaneously. In these examples, the simultaneous operation may enable radar 20 and separate radar to achieve the round-trip time-of-arrival (TOA) and distance/time uncertainty resolution. In some examples, signal processing unit 38 of radar 20 may process signal 42 to simultaneously determine data and timing information of signal 42. In these examples, signal processing unit 38 may also process signal 42 to simultaneously determine obstacle detection information along with the data and the timing information of signal 42.

In some examples, the precision time-of-arrival (TOA) at the 1-way communications receiver of radar 20 may integrate over the entire FMCW sweep, either with non-coherent integration across phase-coded data symbols, or with data-decision aiding to resolve and strip the data before the FFT integration process. In some examples, the precision time-of-arrival may yield a fundamental sweep-symbol resolution of about ⅛₀₀ MHz, or 1.25 nanoseconds (ns) time resolution. In some examples, the high one-way link SNR dB may allow sub-symbol resolutions down to a desired 10 picoseconds (ps), with only a 125² times SNR or 42 dB, which is well within the margin offered for the 1-way link exchange versus the radar return SNR discussed above. In some examples, this precision time of arrival of transmitted signal 42 may be then impressed as data on a reply signal (e.g., transmitted signal 40) in the round-trip timing/ranging process, thus resolving the clock time offset and Doppler offset between radar 20 and another radar.

Figure 3:
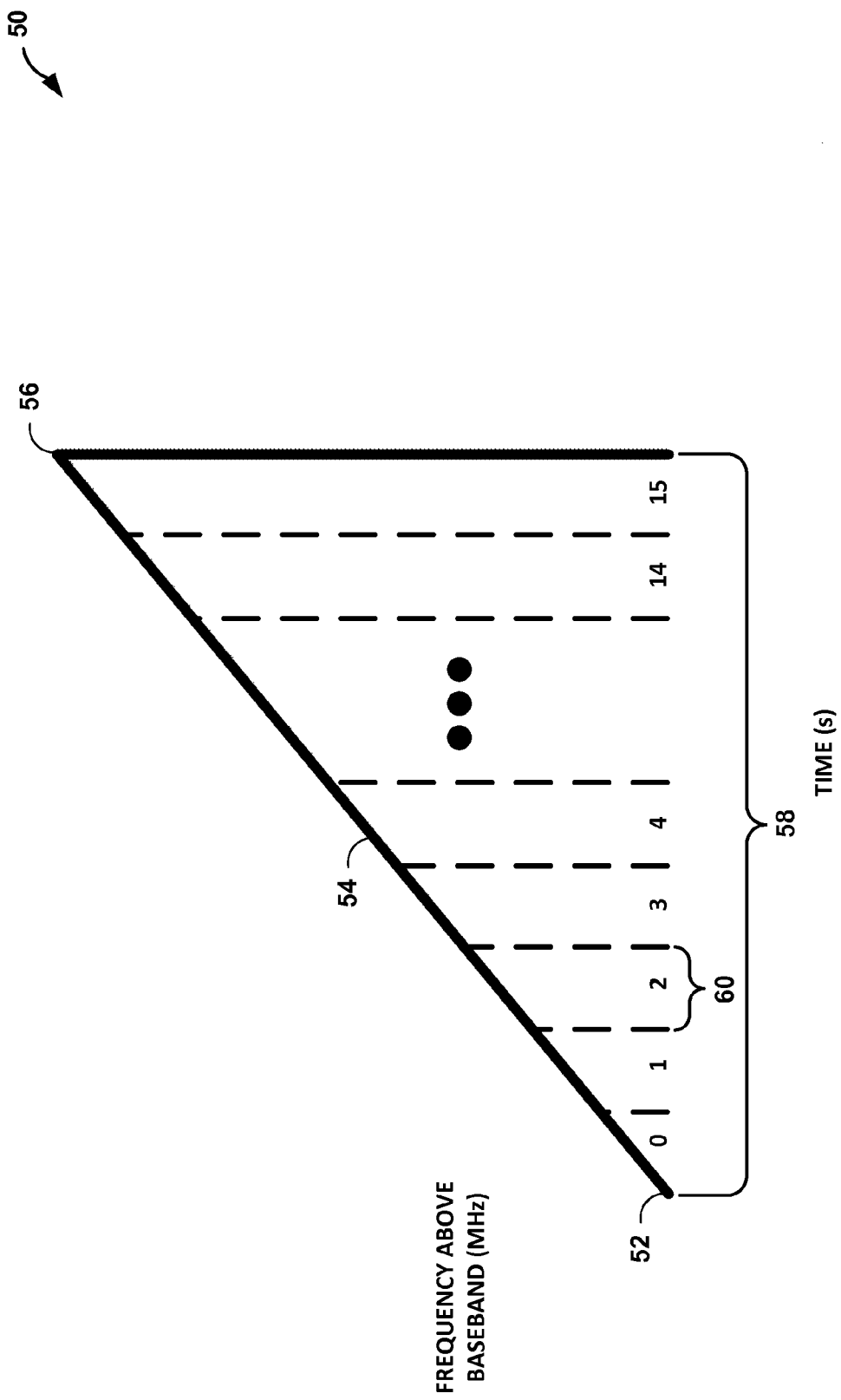
FIG. 3 illustrates a conceptual diagram of a signal, which includes an example FMCW ramp with a phase encoded data channel, in accordance with various aspects of this disclosure.

FIG. 3 illustrates a conceptual diagram of signal 50, which includes an example FMCW ramp with a phase encoded data channel, in accordance with various aspects of this disclosure. FIG. 3 will be described with respect to radar 20; however, it should be understood that radar 2 and radar 8 are also examples of radars that may generate and transmit signals such as signal 50 of FIG. 3. In this regard, signal 50 of FIG. 3 may generally correspond to any of signals 16-22, or signals 40-42.

In the example of FIG. 3, radar 20 may transmit signal 50, which may correspond to transmitted signal 40 from radar 20 as described in FIG. 2. In the example of FIG. 3, radar 20 may receive signal 50, which may correspond to received signal 42 at radar 20 as described in FIG. 2.

In the example of FIG. 3, signal 50 is a radar signal transmitted or received by radar 20 over a period of time. Signal 50 may include baseband frequency 52, frequency ramp 54, peak frequency 56, period 58, and data symbol 60.

In some examples, where signal 50 is transmitted by radar 2, the transmitted frequency may be expressed as Equation 1 as described in FIG. 1, where $f_b$ is baseband frequency 52, $f_1$ is the rate in megahertz per second (MHz/s) of frequency ramp 54, T is period 58 of the repeated frequency ramp, and $t_b$ is the time for the added frequency to return to zero from the peak frequency. In some examples, T (e.g., period 58) may be 4 ms, and peak frequency 56 may be 800 megahertz (MHz) above baseband frequency 52, where baseband frequency 52 may be approximately any carrier frequency depending on the implementation (e.g., 35 GHz).

Data symbol 60 is a portion of frequency ramp 54. In some examples, data symbol may be a 250 microsecond (μs) portion of frequency ramp 54. In some examples, data symbol 60 may have a lower time-bandwidth (TB) product to integrate and may yield a lower SNR than integrating over the full frequency ramp 54. For example, frequency ramp 54 may be 4 ms and subdivided into 16 data symbols including data symbol 60, then there may be a 12 dB lower SNR available in each data symbol than when integrating over the full frequency ramp 54. In this example, the 16 data symbols including data symbol 60 of frequency ramp 54 may be the phase encoded data channel of signal 50. In some examples, data symbol 60 by itself may be the phase encoded data channel of signal 50.

In some examples, signal 50 may be transmitted by radar 2 with a linear frequency ramp from baseband frequency 52 to peak frequency 54. In other examples, signal 50 may be received by radar 2 with a linear frequency ramp from baseband frequency 52 to peak frequency 54.

In some examples, where signal 50 is received at radar 2 from radar 8, then signal 50 may have additional signal power of over 40 dB. In these examples, the additional signal power of 40 dB may compensate for the 12 dB lower SNR available in each data symbol. In this manner, symbol detection of data symbols in signal 50 by radar 2 may be feasible even when the radar return of a transmitted signal has not been detected yet by radar 2.

In some examples, coherent integration of each data symbol (e.g., data symbol 60) may be accomplished in the FIR, which may have the taps of the FIR set to match the chirp of the FMCW ramp. In some examples, the same tap settings may apply to every data symbol, since their frequency progression for linear FMCW may be identical once downconverted to baseband, and only the phase overlay data (e.g., 0 degrees or 180 degrees) differs. The downconversion to baseband may be unique to each data symbol, however, since a fixed local oscillator (LO) must be set to each start frequency of its subsegment ramp. It should be noted that the downconversion with a fixed LO is unlike using a FMCW ramp (a moving, not fixed LO) for de-chirping. In some examples, for initial acquisition, the LO may be set to detect the desired data symbol first, which may be any data symbol in the ramp. For example, the first data symbol may be used for acquisition (say the start of each sweep), so that every data symbol after the first data symbol may convey phase overlay data, which may maximize the message bit packing efficiency. In some examples, data symbol progression and LO frequency may also be hopped randomly across the FMCW sweep for better antijam (AJ) and/or Low Probability of Intercept (LPI) performance. In some examples, after the first data symbol, which may synchronize the receiver of radar 2 to the data bits and ramp sweep times, the LO may then be stepped to the start frequency of each data symbol. In the example of FIG. 3, signal 50 may mean that the DDS may have to step the LO, 50 MHz, every 250 micro-seconds ($\mu$s). It should be understood that the bit times and data rates are only examples, and other bit times and data rates may achieve similar results.

Figure 4:
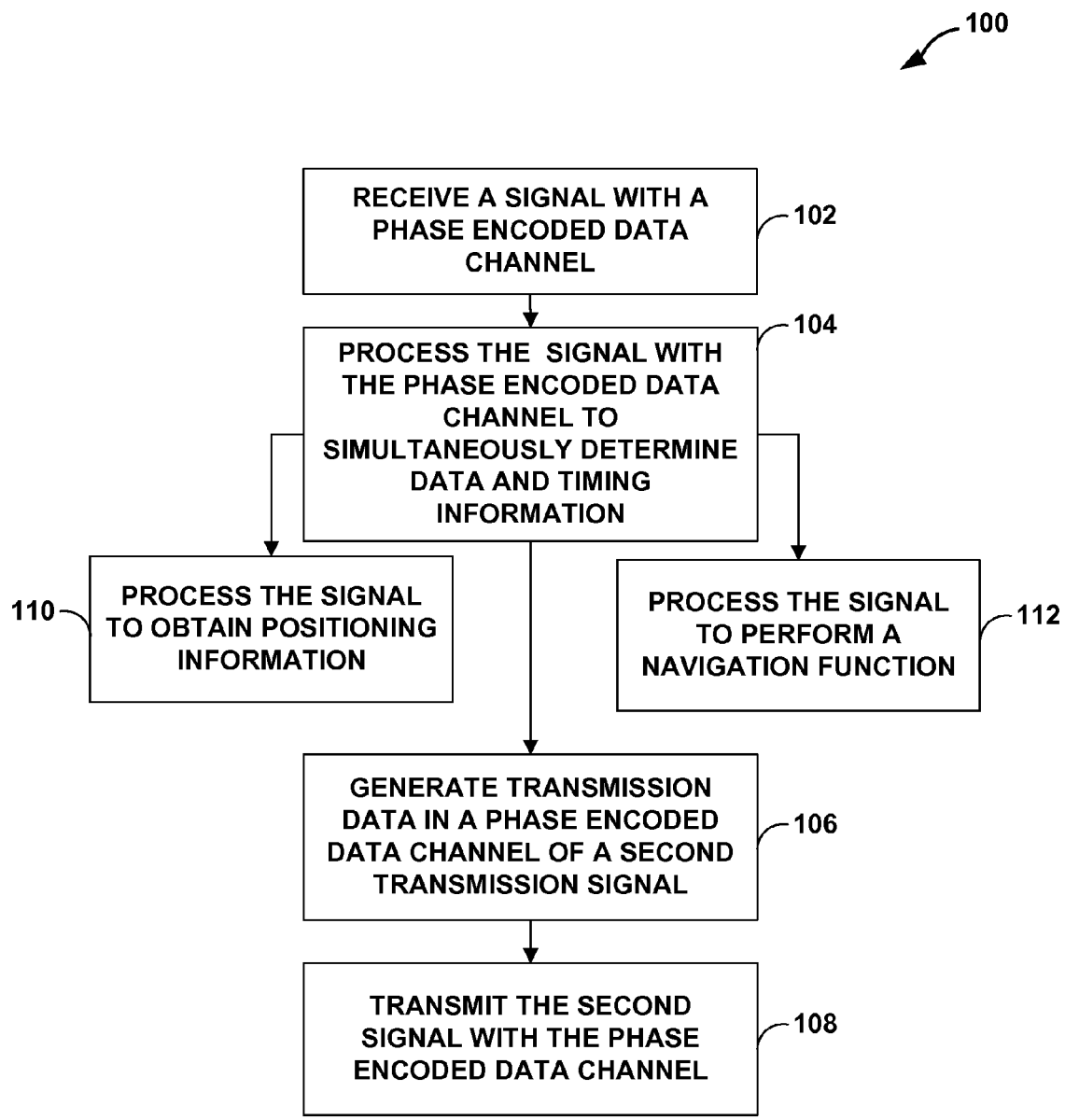
FIG. 4 illustrates a flowchart of an example process of operating a FMCW radar device, in accordance with various aspects of this disclosure.

FIG. 4 illustrates a flowchart of an example process 100 of operating FMCW radar unit 20, in accordance with various aspects of this disclosure. FIG. 4 is described within the context of FIG. 2. In the example of FIG. 4, signal processing unit 38 of a Frequency-Modulated-Continuous-Wave (FMCW) radar unit 20 may receive signal 42 with a phase encoded data channel (102), and signal processing unit 38 of FMCW radar unit 20 may process signal 42 with the phase encoded data channel to simultaneously determine data and timing information (104). In the example of FIG. 4, signal processing unit 38 may generate transmission data in a phase encoded data channel of second signal 40 (106), and transmitter 24 of FMCW radar unit 20 may transmit second signal 40 with the phase encoded data channel (108). In the example of FIG. 4, signal processing unit 38 may process signal 42 to obtain positioning information (110). In the example of FIG. 4, signal processing unit 38 may process signal 42 to perform a navigation function (112). In the example of FIG. 4, second signal 40 with the phase encoded data channel may be configured to be at least one of reflected off of a reflecting surface and received by a second FMCW radar unit or transmitted by FMCW radar unit 20 and directly received by the second FMCW radar unit, where the second FMCW radar unit is separate from FMCW radar unit 20.

In some examples, signal processing unit 38 processing signal 42 with the phase encoded data channel to simultaneously determine the data and the timing information may further include simultaneously processing signal 42 with the phase encoded data channel for obstacle detection information. In some examples, the data may include phase-shift keyed (PSK) data symbols. In these examples, a portion of the PSK data symbols may be a sub-segment of a FMCW sweep, and the portion of the PSK data symbols may also be separately at least one of frequency hopped or scrambled such that the portion of the PSK data symbols provide at least one of AJ or LPI. In some examples, the timing information may include at least one of a time stamp or time of arrival information. In some examples, the data may include one or more network synchronization messages. In some examples, signal processing unit 38 processing the phase encoded data channel may include signal processing unit 38 processing a sub-segment of the phase encoded data channel as a partial band preamble. In some examples, signal 42 with the phase encoded data channel may be a reflected signal from a reflecting surface. In some examples, signal 42 with the phase encoded data channel may be from a second FMCW radar unit separate from FMCW radar unit 20.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for FMCW signal processing. Also, the techniques could be fully implemented in one or more circuits or logic elements.

The techniques of this disclosure may be implemented in a wide variety of devices or apparatuses configured for transmitting or receiving radar. The devices and apparatuses may, for example include integrated circuits (ICs) or sets of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various illustrative aspects of the disclosure are described above. These and other aspects are within the scope of the following claims.

The invention claimed is:

1. A method of using a Frequency-Modulated-Continuous-Wave (FMCW) radar unit for data communication, the method comprising:
   receiving a signal that includes a phase encoded data channel, wherein the phase encoded data channel comprises data and timing information; and
   processing the signal with the phase encoded data channel to simultaneously determine the data and timing information, wherein the timing information comprises at least one of a time stamp or time of arrival information.

2. The method of claim 1, further comprising:
   generating transmission data in a phase encoded data channel of a second signal; and
   transmitting the second signal that includes the phase encoded data channel.

3. The method of claim 2, wherein the second signal that includes the phase encoded data channel is configured to be at least one of reflected off of a reflecting surface and received by a second FMCW radar unit or transmitted from the FMCW radar and directly received by the second FMCW radar unit, and wherein the second FMCW radar unit is separate from the FMCW radar unit that transmits the second signal that includes the phase encoded data channel.

4. The method of claim 1, wherein the processing the signal that includes the phase encoded data channel to simultaneously determine the data and the timing information further includes processing the signal that includes the phase encoded data channel to simultaneously determine obstacle detection information.

5. The method of claim 1, wherein the data comprises phase-shift keyed (PSK) data symbols.

6. The method of claim 5, wherein a portion of the PSK data symbols are a sub-segment of a FMCW sweep, and wherein the portion of the PSK data symbols are separately at least one of frequency hopped or scrambled such that the portion of the PSK data symbols provide at least one of antijam (AJ) or Low Probability of Intercept (LPI) protections.

7. The method of claim 1, wherein processing the phase encoded data channel comprises processing a sub-segment of the phase encoded data channel as a partial band preamble.

8. The method of claim 1, wherein the signal that includes the phase encoded data channel is a reflected signal from a reflecting surface.

9. The method of claim 1, wherein the signal that includes the phase encoded data channel is from a second FMCW radar unit, and wherein the second FMCW radar unit is separate from the FMCW radar unit.

10. A FMCW radar device comprising:
    one or more antennas configured to receive a signal that includes a phase encoded data channel, wherein the phase encoded data channel comprises data and timing information;
    a mixer configured to receive the signal that includes the phase encoded data channel from the one or more antennas and generate a difference signal;
    an analog-to-digital converter (ADC) configured to convert the difference signal of the mixer to a digital difference signal;
    a clock configured to drive a signal processing unit;
    one or more processors of a signal processing unit configured to process the digital difference signal to simultaneously determine the data and timing information, wherein the timing information comprises at least one of a time stamp or time of arrival information; and
    a memory, wherein the memory is configured to store the data and the timing information.

11. The FMCW radar device of claim 10, further comprising:
    one or more antennas configured to transmit a second signal; and
    wherein the one or more processors of the signal processing unit are configured to:
      generate transmission data in a phase encoded data channel of the second signal; and
      control a transmitter to transmit the second signal that includes the phase encoded data channel from the one or more antennas of the FMCW radar device.

12. The FMCW radar device of claim 11, wherein the second signal that includes the phase encoded data channel is configured to be at least one of reflected off of a reflecting surface and received by a second FMCW radar device or transmitted from the FMCW radar device and directly received by the second FMCW radar device, and wherein the second FMCW radar device is separate from the FMCW radar device that transmits the second signal that includes the phase encoded data channel.

13. The FMCW radar device of claim 10, wherein the one or more antennas configured to receive the signal are further configured to receive a reflection of the second signal that includes the phase encoded data channel, and wherein the one or more processors are further configured to process the reflection of the second signal that includes the phase encoded data channel to determine obstacle detection information.

14. The FMCW radar device of claim 10, wherein the one or more processors of the signal processing unit are further configured to:
   process the signal to obtain positioning information; and
   process the signal to perform a navigation function.

15. The FMCW radar device of claim 10, wherein the data comprises one or more network synchronization messages.

16. The FMCW radar device of claim 10, wherein the one or more antennas configured to transmit and the one or more antennas configured to receive comprise at least one of an omni-directional antenna or a directional antenna.

17. The FMCW radar device of claim 10, wherein the signal is a reflected signal from a reflecting surface.

18. The FMCW radar device of claim 10, wherein the signal is a signal from a second FMCW radar device, and wherein the second FMCW radar device is separate from the FMCW radar device.

19. A FMCW radar device comprising:
   one or more antennas configured to receive a signal that includes a phase encoded data channel, wherein the phase encoded data channel comprises data and timing information;
   a mixer configured to receive the signal with the phase encoded data channel from the one or more antennas and generate a difference signal;
   an analog-to-digital converter (ADC) configured to convert the difference signal of the mixer to a digital difference signal;
   a clock configured to drive a signal processing unit;
   one or more processors of the signal processing unit configured to process the digital difference signal to simultaneously determine data, timing information, and obstacle detection information, wherein the timing information comprises at least one of a time stamp or time of arrival information; and
   a memory, wherein the memory is configured to store the data, the timing information, and the obstacle detection information.

20. The FMCW radar device of claim 19, wherein the signal:
   is a reflected signal from a reflecting surface, and
   is from a second FMCW radar device, wherein the second FMCW radar device is separate from the FMCW radar device.

* * * * *